United States Patent [19]
Ooya

[11] Patent Number: 5,391,003
[45] Date of Patent: Feb. 21, 1995

[54] ROLLING GUIDE UNIT

[75] Inventor: Yasumasa Ooya, Gifu, Japan

[73] Assignee: Nippon Thomson Co., Ltd., Tokyo, Japan

[21] Appl. No.: 40,030

[22] Filed: Mar. 30, 1993

[30] Foreign Application Priority Data

Mar. 31, 1992 [JP] Japan .................. 4-103826

[51] Int. Cl.6 .................................. F16C 31/06
[52] U.S. Cl. ........................... 384/44; 384/55
[58] Field of Search ............ 384/43, 44, 45, 47,
384/50, 55, 56, 564, 565, 568, 569, 571, 618,
619, 622, 450

[56] References Cited

U.S. PATENT DOCUMENTS

| | | | |
|---|---|---|---|
| 2,607,641 | 8/1952 | Messinger | 384/622 |
| 3,740,108 | 6/1973 | Fernlund | 384/564 |
| 4,456,313 | 6/1984 | Hartnett et al. | 384/565 |
| 4,606,654 | 8/1986 | Yatsu et al. | 384/619 X |
| 4,634,295 | 1/1987 | Agari | 384/44 |
| 4,692,036 | 9/1987 | Kawaguchi | 384/44 |
| 4,896,974 | 1/1990 | Shimizu | 384/44 X |
| 4,944,607 | 7/1990 | Jacob | 384/44 |

FOREIGN PATENT DOCUMENTS

| | | | |
|---|---|---|---|
| 175564 | 7/1989 | Japan . | |
| 1732032 | 5/1992 | U.S.S.R. | 384/571 |

Primary Examiner—Thomas R. Hannon
Attorney, Agent, or Firm—Browdy and Neimark

[57] ABSTRACT

The rolling guide unit has a track rail formed with raceway surfaces, a casing moveable relative to the track rail and having raceway surfaces at positions facing the raceway surfaces of the track rail, and a number of cylindrical rolls that run rolling between the facing raceway surfaces. An end portion of that raceway surface of the track rail which is heavily loaded with a distributed load is crowned to make the raceway surface at the end portion curved, thereby eliminating uneven load and therefore dents and flaking of the raceway. This enhances durability and sliding characteristics of the raceway surfaces.

13 Claims, 4 Drawing Sheets

ROLLING GUIDE UNIT

BACKGROUND OF THE INVENTION

1. Field of the Invention

The present invention relates to a rolling guide unit in which a second raceway body is made slidable relative to a first raceway body with a number of cylindrical rolls, i.e. rolling elements interposed therebetween.

2. Description of the Prior Art

In a conventional linear motion rolling guide unit, a slider (second raceway body) that slides on a track rail (first raceway body) consists of a casing, end caps fixed to both ends of the casing, end seals attached to both ends of the end caps, and an under seal provided to the underside of the slider, The linear motion rolling guide unit further includes: a number of cylindrical rolls, i.e. rolling elements (also called rollers), that travel rolling in a raceway formed between the raceway surface on the track rail and the raceway surface on the casing; and a retainer fixed to the casing to hold the cylindrical rolls in the casing.

The linear motion rolling guide unit as described above will be explained by referring to FIGS. 7 and 8. FIG. 7 is a perspective view showing one example of a conventional linear motion rolling guide unit. FIG. 8 is a cross section of FIG. 7 taken along the line A—A. The linear motion rolling guide unit shown in the figures is a four-raceway endless linear motion rolling guide unit. It has a track rail 1 with an I-shaped cross section extending in the longitudinal direction, a slider 2 straddling the track rail 1 in such a way that it can move relative to or slide on the track rail 1, and a number of cylindrical rolls 5 rollably interposed between the track rail 1 and the slider 2. The track rail 1 is formed with recessed grooves 8 in longitudinally extending both sides 18 thereof, which form raceway surfaces 9. A recessed portion 11 of the casing 4 is formed with raceway surfaces 10 at positions facing the raceway surfaces 9 on the track rail 1.

The slider 2 has a casing 4 which is formed with the recessed portion 11 so that the casing can straddle the track rail 1, and end caps 6 attached to both longitudinal ends of the casing 4. To seal the boundary between the track rail 1 and the slider 2 when the slider 2 slides on the track rail 1, the ends of the end caps 6 are each provided with an end seal (not shown) and the underside of the slider 2 with an under seal 26.

Between the upper and lower raceway surfaces 10 of the casing 4 is formed an engagement groove 15, which engages with an engagement projection 16 formed on a retainer 3. A part of the retainer 3 is loosely fitted in the recessed groove 8 of the track rail 1 and fixed to the casing 4 by bolts 17.

In the above construction of the 4-raceway endless linear motion rolling guide unit, two raceways are formed on each side of the track rail 1 by the upper and lower raceway surfaces 10 on the track rail 1 and the upper and lower raceway surfaces 10 on the casing 4. Hence, a total of four raceways are formed on both sides of the track rail 1. In these loaded roller raceways, a number of cylindrical rolls 5 roll in contact with the facing raceway surfaces 9 and 10. The casing 4 is formed with return passages 13, 14, and the end caps 6 are formed with direction changing passages 12 that connect the loaded roller raceways and the return passages 13, 14.

Examples of such a four-raceway endless linear motion rolling guide unit include those of Japanese Patent Laid-Open Nos. 175564/1989 and Japanese Patent Application Nos. 106311/1990 and 166326/1991.

As another example of the conventional rolling guide unit there is disclosed a bearing structure, which consists of a first raceway body (first raceway block) and a second raceway body (second raceway block), and a number of cylindrical rolls with a retainer, which are interposed between the first and second raceway blocks whose raceway surfaces each consist of two planes arranged in a V-shaped cross section. In this rolling guide unit, the cylindrical rolls are arranged alternately crossed so as to be able to receive loads in any directions.

As a further example of the prior art rolling guide unit, another bearing structure is disclosed. In this structure, a first raceway body and a second raceway body are provided in the form of an inner ring and an outer ring. The inner ring and the outer ring are each formed with a raceway surface which consists of two planes arranged in a V-shaped cross section. A large number of cylindrical rolls are arranged between the raceway surfaces so as to cross alternately. In this unit, the rolling surface has a line contact so that an elastic deformation caused by loads is small, allowing the bearing to support various kinds of loads such as radial load, axial load and moment load at the same time.

In the conventional linear motion rolling guide units, stress concentration usually occurs at the contact portion between the roll and the raceway, and hence crowning is applied to the rolls and raceways.

However, when the rolls are set in the raceway groove at the inclination angle of 45°, a large stress concentration occurs at one side of the roll. Then, if the crowning is used to increase the diameters at both ends of the roll, another problem arises that the load capacity of the guide unit as a whole virtually decreases. While it is possible to apply crowning to the end portions of the rolling surface of the roll so that the end portions have different amounts of crowning, this will result in an increased cost because of complicated assembly.

When a number of cylindrical rolls 5 travel rotating between the raceway surface 9 of the track rail 1 and the raceway surface 10 of the casing 4, the rolls 5 perform complex motion on the raceway surfaces that are inclined at 45°, causing stress concentration at the edge or end portion of the raceway surface 9 of the track rail 1. As a result, the raceway surface 9 may produce flaking, dents or, in the worst case, break due to edge load. Once flaking and dents due to edge load occur in the raceway surface 9 of the track rail 1, the performance of the slider 2 having the casing 4 and the end caps 6 with respect to the track rail 1 deteriorates. Particularly for track rails 1 with smaller width, the probability of occurrence of dents caused by edge load is high.

Such flaking and dents due to edge load also occur in other rolling guide units or bearings mentioned above, where a number of cylindrical rolls are interposed between the raceway surfaces of the first and second raceway bodies.

SUMMARY OF THE INVENTION

An object of the present invention is to solve the above-mentioned problems and provide a rolling guide unit which comprises: a first raceway body having raceway surfaces formed on the sidewalls thereof; a second raceway body slidable relative to the first raceway body and having raceway surfaces formed at positions facing the raceway surfaces of the first raceway body; and a number of cylindrical rolls that travel rolling between the raceway surfaces of the first and the second raceway bodies; whereby an edge or an end portion of that raceway surface which is heavily loaded with a distributed load is locally crowned to make the raceway surface at the end portion curved to eliminate edge loading on the raceway surfaces and therefore to prevent dents and flaking due to edge loading so as to improve durability and sliding characteristic of the raceway surfaces.

In this rolling guide unit, the first raceway body is formed by a track rail which has raceway surfaces formed on the longitudinally extending side walls thereof and the second raceway body is formed by a slider, which performs a linear motion and which has a casing and end caps mounted to the longitudinal ends of the casing which have a direction changing path. The cylindrical rolls endlessly circulate through the direction changing paths in the end caps, raceways formed between the raceway surfaces and the return paths in the casing.

Or, in this rolling guide unit, the first and second raceway bodies extend linearly longitudinally and have the raceway surfaces formed on the side walls thereof; the raceway surface of the first raceway body and the raceway surface of the second raceway body are each formed of upper and lower raceway surfaces arranged V-shaped in cross section; and the cylindrical rolls are arranged between the raceway surfaces, oriented in two crossing directions, and alternated with each other. The unit performs a finite linear motion.

Or, in this rolling guide unit, the first raceway body has a circular portion; the raceway surface of the first raceway body consists of upper and lower raceway surfaces arranged V-shaped in cross section which are formed on the outer circumferential surface of an inner ring secured to the outer circumferential surface of the circular portion; the second raceway body has a cylindrical portion; the raceway surface of the second raceway body consists of upper and lower raceway surfaces arranged V-shaped in cross section which are formed on the inner circumferential surface of an outer ring secured to the inner circumferential surface of the cylindrical portion; and the cylindrical rolls are arranged between the raceway surfaces, oriented in two crossing directions, and alternated with each other.

In this rolling guide unit, an end portion of that raceway surface which is heavily loaded with a distributed load is locally crowned to make the raceway surface at the end portion slightly curved, thus eliminating edge loading and flaking caused by edge load and minimizing stress concentration in the raceway surface.

The rolling guide unit according to the present invention minimizes contact stress concentration due to edge loading and dents caused by heavy loading or impact loading and substantially reduces the occurrence of flaking, thus improving the performance of the unit.

The rolling guide unit of this invention can be applied to a bearing, one form of linear motion rolling guide unit, which consists of a track rail, a slider and a number of cylindrical rolls arranged between the raceway surfaces of the track rail and the slider. The above-mentioned effects can also be obtained when this invention is applied to the raceway surfaces in such bearings as consist of two raceway blocks and perform a finite linear motion and to the raceway surfaces in bearings, such as crossed roller bearings, that have inner and outer rings.

DETAILED DESCRIPTION OF EMBODIMENTS

Figure 1:
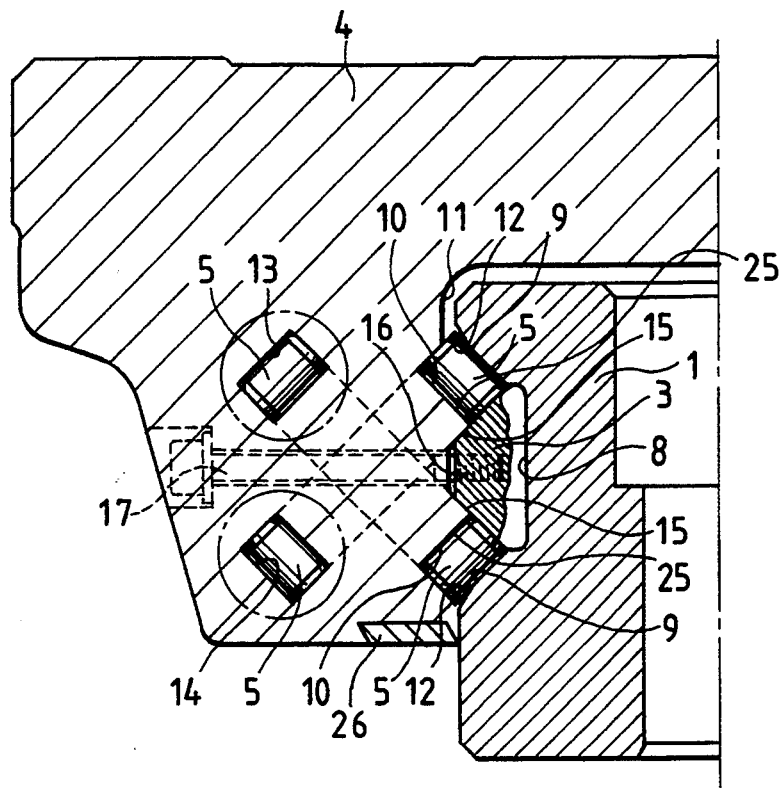
FIG. 1 is a cross section of the linear motion rolling guide unit as one embodiment of this invention.
Figure 2:
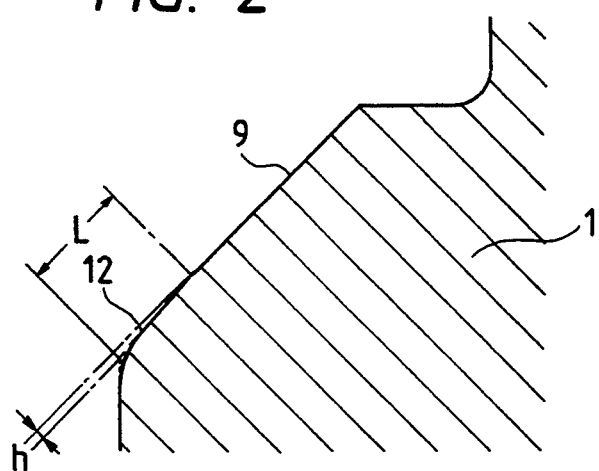
FIG. 2 is a partly enlarged view of FIG. 1 showing the crowning of the raceway surface of the linear motion rolling guide unit of this embodiment.

Now, by referring to the accompanying drawings, embodiments of the linear motion rolling guide unit according to this invention will be described. In FIG. 1 and 2, parts that have the same functions as those in FIG. 8 are assigned identical reference numbers.

Figure 8:
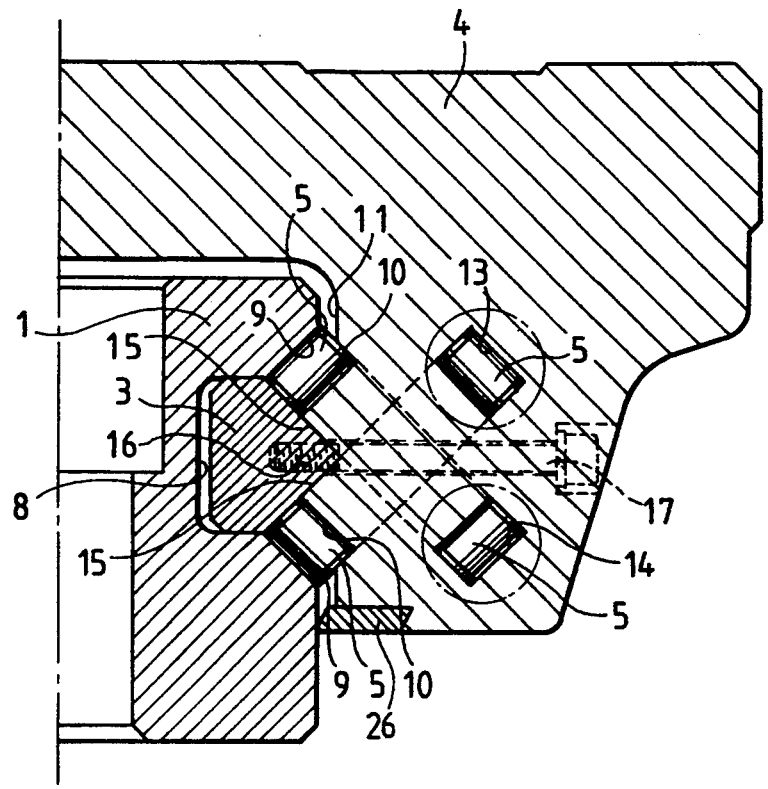
FIG. 8 is a cross section taken along the line A—A of FIG. 7.

The rolling guide unit of this invention has basically the same construction as that shown in FIG. 8, except that the raceway surface is subjected to a crowning work. This rolling guide unit is of an endless circulating type and consists of: a track rail 1 having raceway surfaces 9 extending longitudinally on both side walls thereof, the track rail forming a first raceway body; a casing 4 slidable relative to the track rail 1 and having raceway surfaces 10 formed at positions facing the raceway surfaces 9 on the track rail, the casing forming a second raceway body; end caps 6 (not shown) attached to the longitudinal ends of the casing 4; raceways formed between the facing raceway surfaces 9, 10; direction changing paths; return paths 13, 14; and a number of cylindrical rolls 5 circulating through the raceways, direction changing paths and return paths.

One of the characteristics of this rolling guide unit is that the end portions 12 and/or 25 of the raceway surface 9 of the track rail 1 subject to heavy distributed load are locally crowned, making the raceway surface curved. While the both end portions 12 and 25 are crowned, it is also possible to apply crowning to only one end portion 12 or 25. The crowning can be done for the raceway by a rotary dresser. Applying crowning to the raceway will reduce the rigidity. The crowning for the raceway 9 is preferably such that the crowned area is about 1.3 mm in length L from the end surface and 3–5 $\mu$m in depth h, the length being about a quarter to a third of the total length (see FIG. 2). The geometry of the crown is a combination of a slightly curved surface about 3–5 $\mu$m deep and a greatly curved surface at the end, forming a so-called logarithmic curve in cross section.

To cope with vertical loads, the upper and lower raceway surfaces 9 of the track rail 1 may be crowned. In that case, the crowning should be controlled to minimize the possible reduction in rigidity of the track rail 1. When the rolling guide unit is subjected to lateral load, the upper and lower raceway surfaces 9 of the track rail 1 and the upper and lower raceway surfaces 10 of the casing 4 may be crowned to deal with the lateral loads. In this case, it is also necessary to control the crowning to minimize the possible reduction in the rigidity of the track rail 1 and the casing 4.

Figure 3:
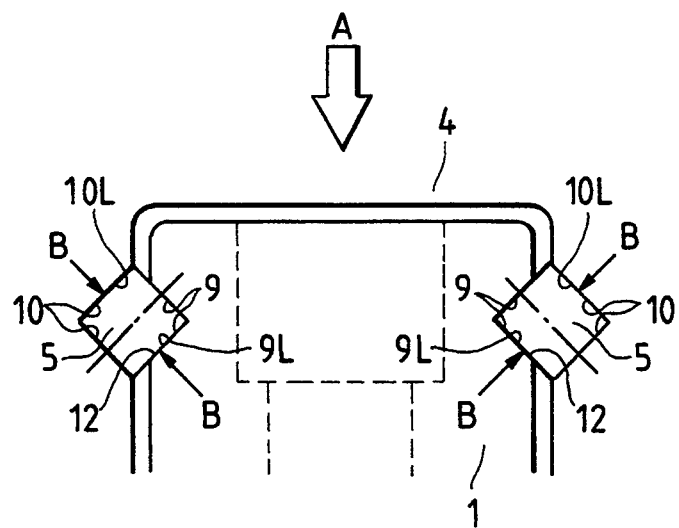
FIG. 3 is a cross section of the linear motion rolling guide unit according to this invention when subjected to a downward load.
Figure 4:
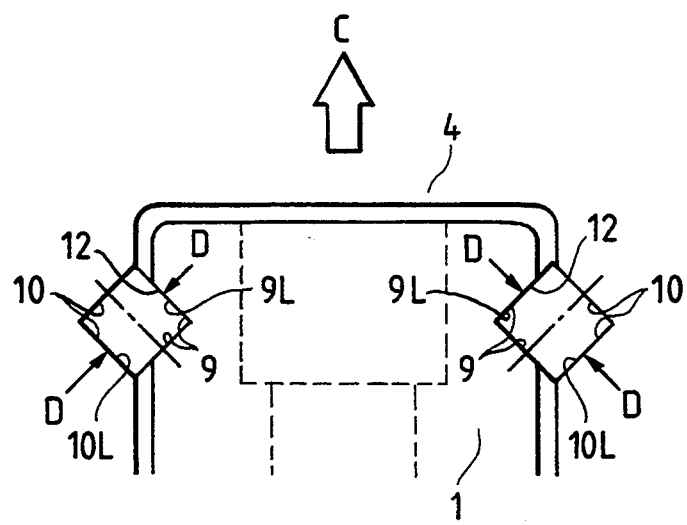
FIG. 4 is a cross section of the linear motion rolling guide unit according to this invention when subjected to an upward load.

In this rolling guide unit, the end portion 12 of the raceway surface 9 of the track rail 1 on the load side will be explained by referring to FIG. 3 and 4. In FIG. 3 and 4, parts that are identical with those in FIG. 1 are given like reference numerals.

As shown in FIG. 3, when a downwardly acting load (arrow A) is applied to the rolling guide unit, the cylindrical roll 5 is loaded in the direction of arrow B. Hence, as a reaction, of the raceway surfaces 9 of the track rail 1, the one designated 9L is the loaded side. As to the raceway surfaces 10 of the casing 4, the one denoted 10L is the loaded side. In this embodiment, crowning is applied to the end portion 12 of the loaded raceway surface 9L of the track rail 1 to form the surface at the end portion 12 curved.

As shown in FIG. 4, when the rolling guide unit is subjected to an upwardly acting load (arrow C), the cylindrical roll 5 is loaded in the direction D. Therefore, as a reaction, of the raceway surfaces 9 of the track rail 1, the raceway surface denoted 9L is the loaded side. As to the raceway surfaces 10 of the casing 4, the one denoted 10L is the loaded side. Here, crowning is done to the end portion 12 of the loaded raceway surface 9L of the track rail 1 to form the surface of portion 12 curved. The crowned raceway surface 9L has a slight curvature that helps prevent the occurrence of edge load and therefore the flaking and dents.

Figure 5:
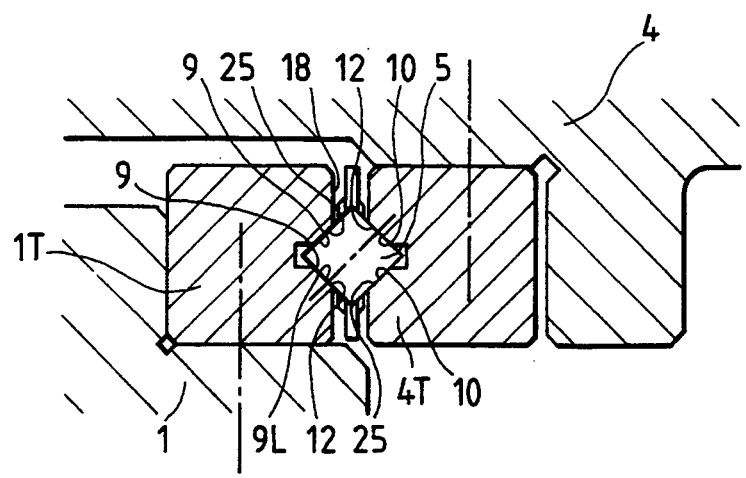
FIG. 5 is a cross section of the linear motion rolling guide unit as another embodiment of the invention.

Next, referring to FIG. 5, another embodiment of the rolling guide unit according to the present invention will be described. In this guide unit, cylindrical rolls are interposed between a pair of raceway bodies so that the raceway bodies are movable relative to each other, each raceway body having a raceway surface consisting of two planes arranged V-shaped in cross section. In this guide unit, the track rail 1 constitutes a first raceway body and the casing 4 a second raceway body. A crossed rollerway consisting of raceway blocks 1T, 4T and the cylindrical rolls 5 is incorporated between the track rail 1 and the casing 4. The crossed rollerway performs a finite linear motion. The raceway block 1T is secured to the track rail 1 by such fastening means as bolt and the other raceway block 4T to the casing 4 by similar means. The raceway block 1T is formed with a raceway surface 9—which consists of two planes arranged V-shaped in cross section—extending longitudinally on a side wall 18. Similarly, the raceway block 4T is formed with a raceway surface 10, which consists of two planes arranged V-shaped in cross section and faces the raceway surface 9. A large number of cylindrical rolls 5 are installed between the raceway surfaces 9 and 10 in two alternate directions crossing each other. To describe in more detail, the cylindrical rolls 5 consist of a number of first cylindrical rolls 5 and a number of second cylindrical rolls 5, the first cylindrical rolls 60 being installed between the upper raceway surface 9 of the raceway block 1T and the lower raceway surface 10 of the raceway block 4T, the second cylindrical rolls being installed between the lower raceway surface 9 of the raceway block 1T and the upper raceway surface 10 of the raceway block 4T. The first cylindrical rolls 5 and the second cylindrical rolls 5 are oriented in two crossing directions and are alternated with each other.

Like the rolling guide unit described above, the bearing or crossed rollerway of FIG. 5 has its end portions 12 and 25 of the loaded raceway surface 9L crowned to form the surfaces of the end portions 12, 25 curved. Further, the crowning may also be applied to the end portions 12 and 25 of the raceway surface 10. Or it may be applied to only one of the raceways 9 and 10, or to only one of the end portions 12 and 25 in each raceway surface 9, 10.

Figure 6:
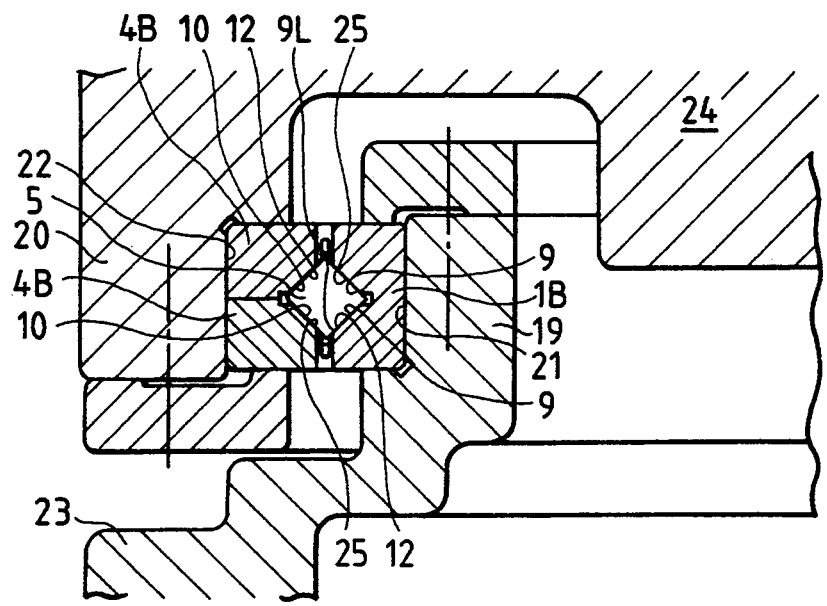
FIG. 6 is a cross section of the linear motion rolling guide unit as still another embodiment of the invention.
Figure 7:
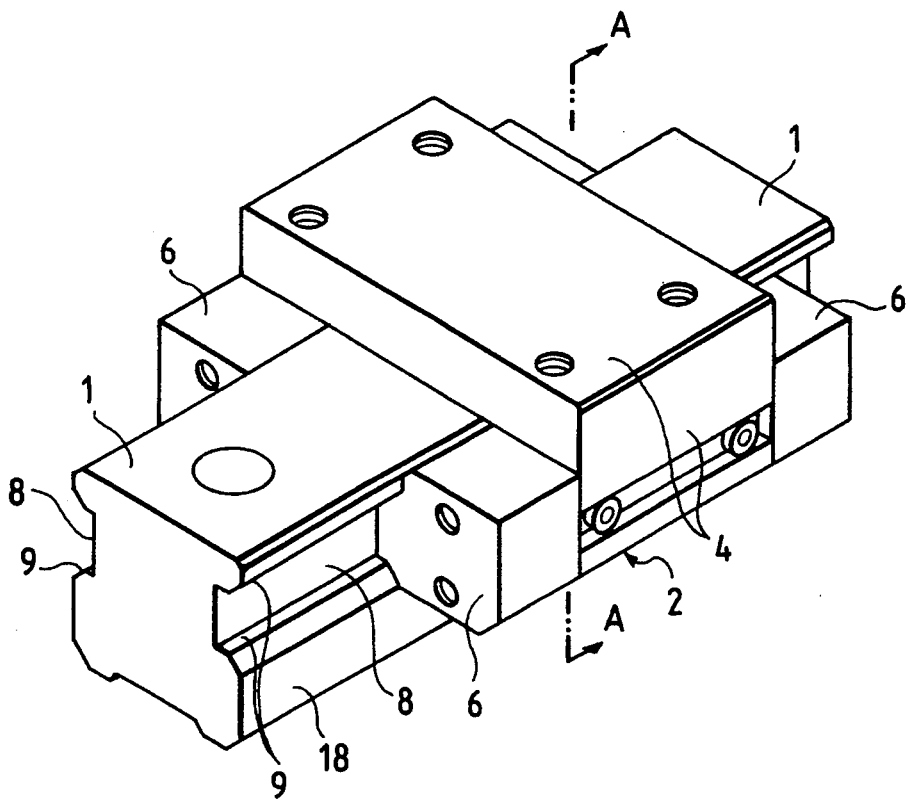
FIG. 7 is a perspective view of a conventional linear motion rolling guide unit.

Next, by referring to FIG. 6, a further embodiment of the rolling guide unit according to the present invention will be explained. This rolling guide unit is a crossed roller bearing in which a number of cylindrical rolls are installed between a pair of raceway bodies which move relative to each other. The raceway bodies each have an upper and a lower raceway surface, arranged V-shaped in cross section. In this rolling guide unit, the first raceway body is an inner ring 1B secured to an outer circumferential surface 21 of a circular portion 19 (shown cylindrical in FIG. 6) of a base 23 by a fastening means. The second raceway body is upper and lower outer rings 4B, 4B which are fixed, by fastening means, to an inner circumferential surface 22 of a cylindrical portion 20 of a movable body 24 which moves relative to the base 23. In this rolling guide unit, a number of cylindrical rolls 5 are arranged between the inner ring 1B and the outer pings 4B in two alternately crossing directions. The inner ring 1B is formed on its outer circumferential surface with upper and lower raceway surfaces 9, 9 that form a V-shaped letter in cross section. The upper and lower outer rings 4B, 4B are formed on their inner circumferential surfaces with a cross-sectionally V-shaped upper raceway surface 10 and a lower raceway surface 10, respectively. To describe in more detail, the cylindrical rolls 5 consist of a number of first cylindrical rolls 5 and a number of second cylindrical rolls 5, the first cylindrical rolls being interposed between the upper raceway surface 9 of the inner ring 1B and the lower raceway surface 10 of the outer ring 4B, the second cylindrical rolls being interposed between the lower raceway surface 9 of the inner ring 1B and the upper raceway surface 10 of the outer ring 4B. The first cylindrical rolls 5 and the second cylindrical rolls 5 are oriented in two crossing directions and are alternated with each other.

Like the rolling guide unit described above, the bearing of FIG. 6 has its end portions 12 and 25 of the loaded raceway surface 9L crowned to form the surfaces of the end portions 12, 25 curved. Further, the crowning may also be applied to the end portions 12 and 25 of both the upper and Lower raceway surfaces 10, 10. Or it may be applied to only one of the raceways 9 and 10, or to only one of the end portions 12 and 25 in each raceway surface 9, 10.

I claim:

1. A rolling guide unit comprising:
    a first raceway body having first raceway surfaces formed on the sidewalls thereof;
    a second raceway body having second raceway surfaces at a position facing the first raceway surface, the second raceway body being slidable relative to the first raceway body; and
    cylindrical rolls rollable between the first raceway surfaces of the first raceway body and the second raceway surfaces of the second raceway body;
    wherein end portions of the first raceway surfaces, or the second raceway surfaces, whichever are loaded, are on a side against which the cylindrical rolls are pressed, and wherein the end portions are crowned to make the surfaces of the end portions curved, whereby stress concentration is avoided over the end portions.

2. A rolling guide unit according to claim 1, wherein the crowned end portions of the loaded raceway surfaces are on only one side of the raceway surfaces.

3. A rolling guide unit according to claim 1, wherein the first raceway body is a track rail having the raceway surfaces longitudinally extending on both side walls thereof and the second raceway body is a slider that is mounted astride the track rail and performs a sliding motion on it.

4. A rolling guide unit according to claim 3, wherein the slider has a casing, which is formed with the raceway surfaces and return paths for the cylindrical rolls extending parallel to the raceway surfaces, and end caps, which are mounted to the longitudinal ends of the casing to change the direction of the cylindrical rolls.

5. A rolling guide unit according to claim 1, wherein the first raceway body and the second raceway body extend linearly longitudinally and have the raceway surfaces formed on the side walls thereof; the raceway surfaces of the first and second raceway bodies each have upper raceway surfaces and lower raceway surfaces arranged V-shaped in cross section; and the cylindrical rolls consist of first cylindrical rolls and second cylindrical rolls, the first cylindrical rolls being arranged between the upper raceway surfaces of the first raceway body and the lower raceway surfaces of the second raceway body, the second cylindrical rolls being arranged between the lower raceway surfaces of the first raceway body and the upper raceway surfaces of the second raceway body.

6. A rolling guide unit according to claim 5, wherein the first cylindrical rolls and the second cylindrical rolls are oriented in two crossing directions and are alternated with each other.

7. A rolling guide unit comprising:
a base having a circular portion;
a movable body having a cylindrical portion on the outer side of and facing the circular portion;
an inner ring secured to the outer circumferential surface of the circular portion of the base;
upper and lower raceway surfaces formed on the outer circumferential surface of the inner ring in such a way that they form a letter V in cross section;
outer rings secured to the inner circumferential surface of the movable body;
upper and lower raceway surfaces formed on the inner circumferential surface of the outer ring in such a way that they form a letter V in cross section;
first cylindrical rolls arranged between the upper raceway surface of the inner ring and the lower raceway surface of the outer ring; and
second cylindrical rolls arranged between the lower raceway surface of the inner ring and the upper raceway surface of the outer ring;
wherein an end portion of the upper raceway surface or the lower raceway surface of the inner and outer rings, whichever is loaded, is on a side against which the first cylindrical rolls and the second cylindrical rolls are pressed, and wherein the end portion is crowned to make the raceway surface at the end portion curved, whereby stress concentration is avoided over the end portion.

8. A rolling guide unit according to claim 7, wherein the first cylindrical rolls and the second cylindrical rolls are oriented in two crossing directions and are alternated with each other.

9. In a raceway having cylindrical rollers disposed between a first surface and a second surface for relative motion of the first surface and the second surface, where the rollers resist a compressive force between the first surface and the second surface and the force is in a direction at a force angle other than perpendicular to cylindrical axes of the rollers, the improvement comprising:
said first surface, along a section line perpendicular to a direction of the relative motion, having a straight portion in contact with the roller, and a curved portion smoothly joined to the straight portion, the curved portion curving away from the roller;
the curved portion being disposed at a side of the first surface such that said side is proximal an acute angle between the direction of the force and the first surface.

10. The improvement according to claim 9, wherein a radius of curvature of the curved portion decreases with distance from the straight portion.

11. The improvement according to claim 10, wherein the curved portion has a generally logarithmic shape.

12. The improvement according to claim 9, wherein the curved portion is between one quarter and one third of a total length of the line.

13. The improvement according to claim 9, wherein the curved portion is displaced away from an extension of the straight portion between 3.0 and 5.0 $\mu$m.

* * * * *